F. E. SHAILOR & O. D. STORER.
FLUID RECEPTACLE.
APPLICATION FILED APR. 1, 1909.

1,006,692.

Patented Oct. 24, 1911.

Witnesses:

Inventors:
Frank E. Shailor,
Otis D. Storer,
by
Atty.

UNITED STATES PATENT OFFICE.

FRANK E. SHAILOR AND OTIS D. STORER, OF PITTSFIELD, MASSACHUSETTS, ASSIGNORS TO GENERAL ELECTRIC COMPANY, A CORPORATION OF NEW YORK.

FLUID-RECEPTACLE.

1,006,692.   Specification of Letters Patent.   Patented Oct. 24, 1911.

Application filed April 1, 1909. Serial No. 487,165.

*To all whom it may concern:*

Be it known that we, FRANK E. SHAILOR and OTIS D. STORER, citizens of the United States, residing at Pittsfield, in the county of Berkshire, State of Massachusetts, have invented certain new and useful Improvements in Fluid-Receptacles, of which the following is a specification.

This invention relates to fluid receptacles for use in connection with electric heaters and the like and has for its object the provision of a device of this character which is so reinforced that it does not change its form, as for instance, by bulging or buckling, when heated.

Our invention relates more specifically to receptacles intended for use with electric heating units, as for instance, a flat unit applied to the bottom of a receptacle.

When the electric heating unit is applied to the flat bottom of a receptacle it has been found that when the temperature is raised, the tendency is for the bottom to expand or bulge and thereby force the heating unit out of intimate thermal relation with the receptacle thereby reducing the efficiency of heat transmission.

One of the objects of our invention, therefore, is to overcome this difficulty by reinforcing the bottom without perforating it.

In carrying out our invention, we secure a reinforcing plate to the bottom by means of an adhering metal, as for instance, by brazing or hard soldering. The plate is preferably flanged, as for instance, by making it cup-shaped so as to give it the necessary strength while still maintaining a flat surface for the heating unit.

Other objects of our invention will appear in the course of the following specification, in which we have shown our invention embodied in concrete form for purposes of illustration.

Figure 1:
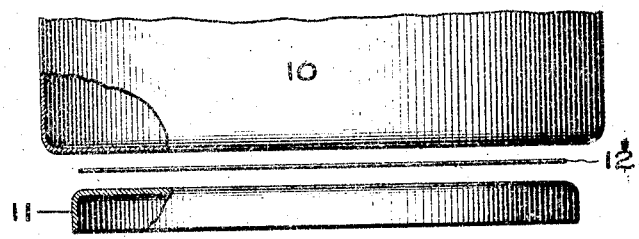
Figure 2:
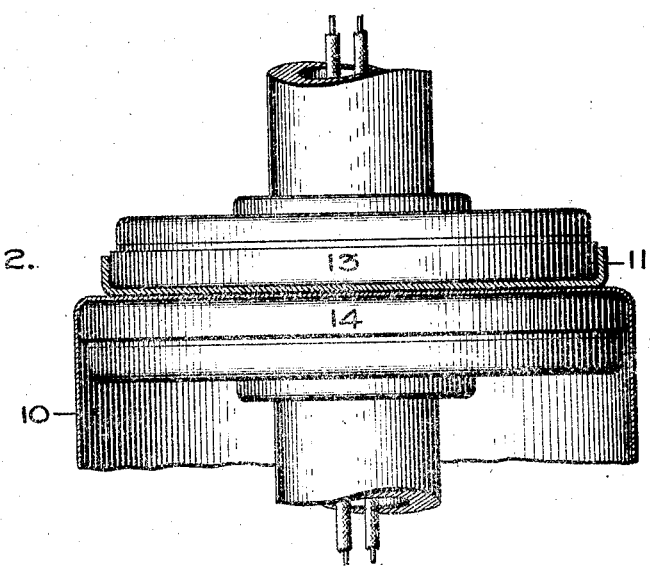
Figure 3:
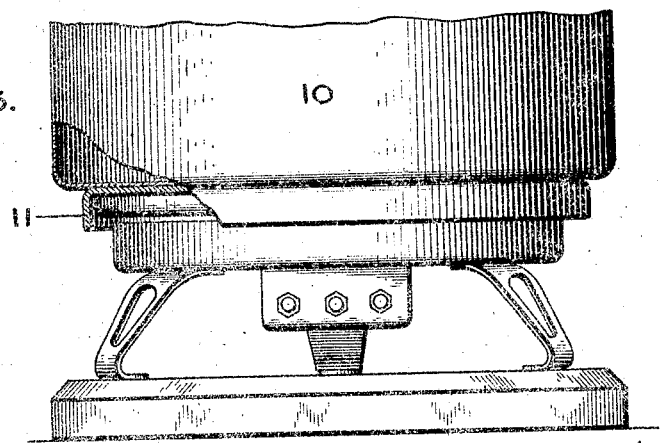

In the drawing showing the device embodying our invention, Figure 1 represents a fragmentary view of a receptacle and reinforcing plate with a sheet or strip of soldering metal between them; Fig. 2 shows the same view with heating units applied to it to melt the brazing material and secure the parts together; Fig. 3 shows the same device applied to a flat electric stove.

Referring to the drawing, 10 represents a fluid receptacle which may be of any desired shape and material, as for instance, copper or iron, which is commonly used in receptacles of this character.

11 represents a reinforcing member, which we have shown cup-shaped so as to fit over the flat heating unit. This plate may be of any desired material, as for instance, iron. The plate is adapted to substantially cover the bottom of the receptacle and is to be secured thereto by brazing it to the bottom of the receptacle.

The method of soldering the plate to the receptacle is shown in Fig. 2 and we regard this method as an important feature, inasmuch as it facilitates the soldering operation and gives a uniform joint. To accomplish this soldering operation we place a plate 12 of soldering material, such as a brazing or silver solder alloy, between the receptacle and the reinforcing member. Two flat heating units, 13 and 14, are placed one on each side to engage with each surface, as shown in Fig. 2, and the bottom and reinforcing plate are pressed together. When current is passed through the two heating units, the temperature is raised until the solder melts and the two surfaces are united, so that when the units are cooled, the bottom of the receptacle and the reinforcing plate act as a unit, thereby preventing the bulging or buckling of the bottom. By making the reinforcing plate cup-shaped, we not only stiffen it, but also provide a recess for the heating unit. The receptacle is then placed upon the heating unit, as for instance, an electric stove, as shown in Fig. 3.

While we have shown our invention as being carried out in a specific manner in accordance with the patent statutes, it should be understood that we do not limit our invention thereto, since various modifications will suggest themselves to those skilled in the art, without departing from the spirit of our invention, the scope of which is set forth in the annexed claims.

What we claim as new and desire to secure by Letters Patent of the United States, is,

1. A fluid receptacle having a reinforcing plate secured to the bottom thereof by an adhering metal fused thereto over the entire surface.

2. A fluid receptacle having a reinforcing plate brazed to the bottom thereof over its entire surface.

3. A fluid receptacle having a flanged reinforcing plate secured to the bottom over the whole surface by an adhering metal.

4. A fluid receptacle having a flanged plate secured to the bottom thereof, the flange extending entirely within the entire area of the bottom to reinforce the same.

5. A fluid receptacle having a cup-shaped reinforcing plate secured to the bottom thereof by an adhering metal over the whole surface.

6. A fluid receptacle having a flanged reinforcing plate secured to the bottom thereof by an adhering metal fused over the entire surface, the flange extending entirely over the area of the bottom to reinforce the same.

In witness whereof, we have hereunto set our hands this 29th day of March, 1909.

FRANK E. SHAILOR.
OTIS D. STORER.

Witnesses:
HENRY PRICE BALL,
JAMES SWETT SMYSER.